Oct. 14, 1952  D. E. ERICSON ET AL  2,614,057
TIRE BUILDING DRUM

Filed Feb. 21, 1951  3 Sheets-Sheet 1

INVENTOR.
DONALD E. ERICSON
ERNEST E. KWIERANT
BY James J. Long
AGENT.

Oct. 14, 1952    D. E. ERICSON ET AL    2,614,057
TIRE BUILDING DRUM
Filed Feb. 21, 1951    3 Sheets-Sheet 2

INVENTOR.
DONALD E. ERICSON
ERNEST E. KWIERANT
BY
*James J. Long*
AGENT.

Oct. 14, 1952 D. E. ERICSON ET AL 2,614,057
TIRE BUILDING DRUM
Filed Feb. 21, 1951 3 Sheets-Sheet 3
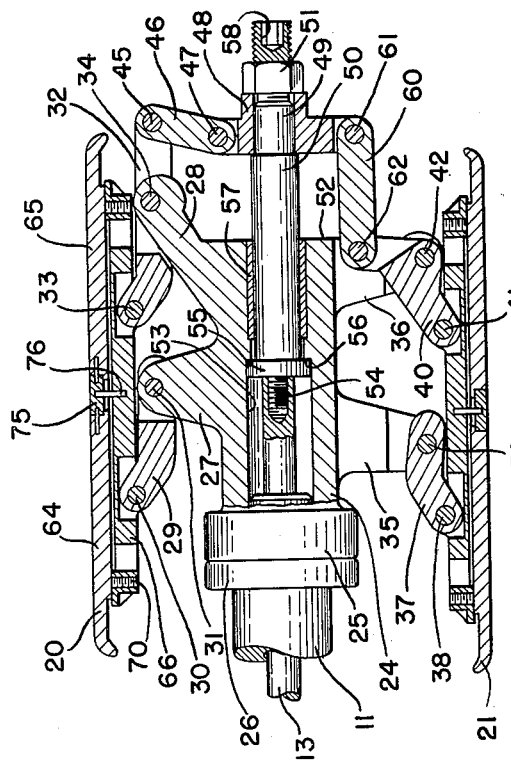
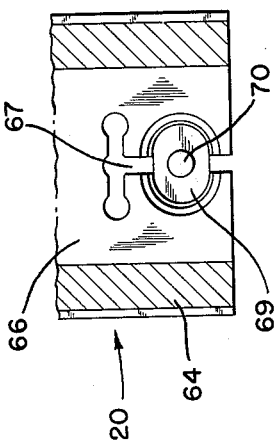
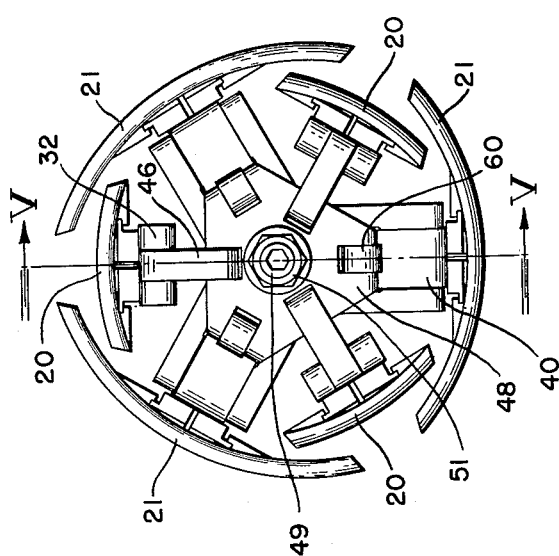
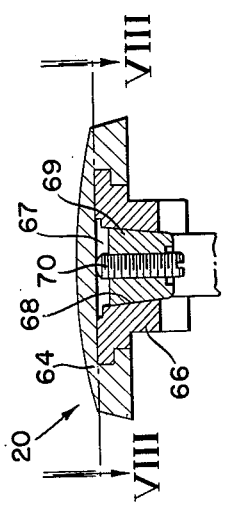
INVENTOR.
DONALD E. ERICSON
BY ERNEST E. KWIERANT
James J. Long
AGENT.

Patented Oct. 14, 1952

2,614,057

UNITED STATES PATENT OFFICE 2,614,057

TIRE BUILDING DRUM

Donald E. Ericson, Detroit, and Ernest E. Kwierant, Van Dyke, Mich., assignors to United States Rubber Company, New York, N. Y., a corporation of New Jersey Application February 21, 1951, Serial No. 212,050

11 Claims. (Cl. 154—9)

This invention relates to an improved tire building drum, and more particularly it relates to a tire building drum formed of a plurality of separate segments which may be collapsed so that the tire may be removed from the drum.

It is conventional to build pneumatic tire casings by assembling the component parts thereof, such as the carcass plies, the inextensible beads, and the tread and sidewall portions, in the form of a flat band on the surface of a rotating building drum. The bead portions, or lateral edges of the band as assembled on the drum, normally are turned radially inwardly of the drum building surface so as to overlap the edges of the drum. In order to permit removal of the completed raw tire band from the drum, the various segments of the drum are arranged for collapsing movement, that is, the drum segments may be drawn inwardly, thus freeing the raw tire band for removal and subsequent shaping and vulcanizing operations.

One object of the invention is to provide a collapsible tire building drum in which the various segments comprising the drum move without becoming axially offset to any great extent relative to each other as the drum starts to collapse, in order to prevent stress and possible distortion in the overlapping bead portions of the raw tire band.

Another object of the invention is the provision of a tire building drum which can be quickly and accurately expanded and collapsed, and yet is of relatively simple and rugged construction.

Still another object is to provide a tire building drum which is collapsible to a relatively small diameter.

A further object of the invention is the provision of a collapsible drum having an essentially flat, continuous building surface, which surface can be adjusted with respect to its width without disturbing the smooth continuity thereof.

Further objects and advantages of the invention will be made evident in the following detailed description of the invention, which is intended to be read with reference to the accompanying drawings, wherein:

Fig. 4 is an end view of the drum in the collapsed condition;

Fig. 5 is a longitudinal sectional view of the drum in the collapsed condition, taken along line 5—5 of Fig. 4;

Fig. 7 is a fragmentary transverse sectional view on a larger scale taken along line 7—7 of Fig. 1, of a means for securing the segment members; and Fig. 8 is a fragmentary plan view, taken partly in section along line 8—8 of Fig. 7.

Figure 1:
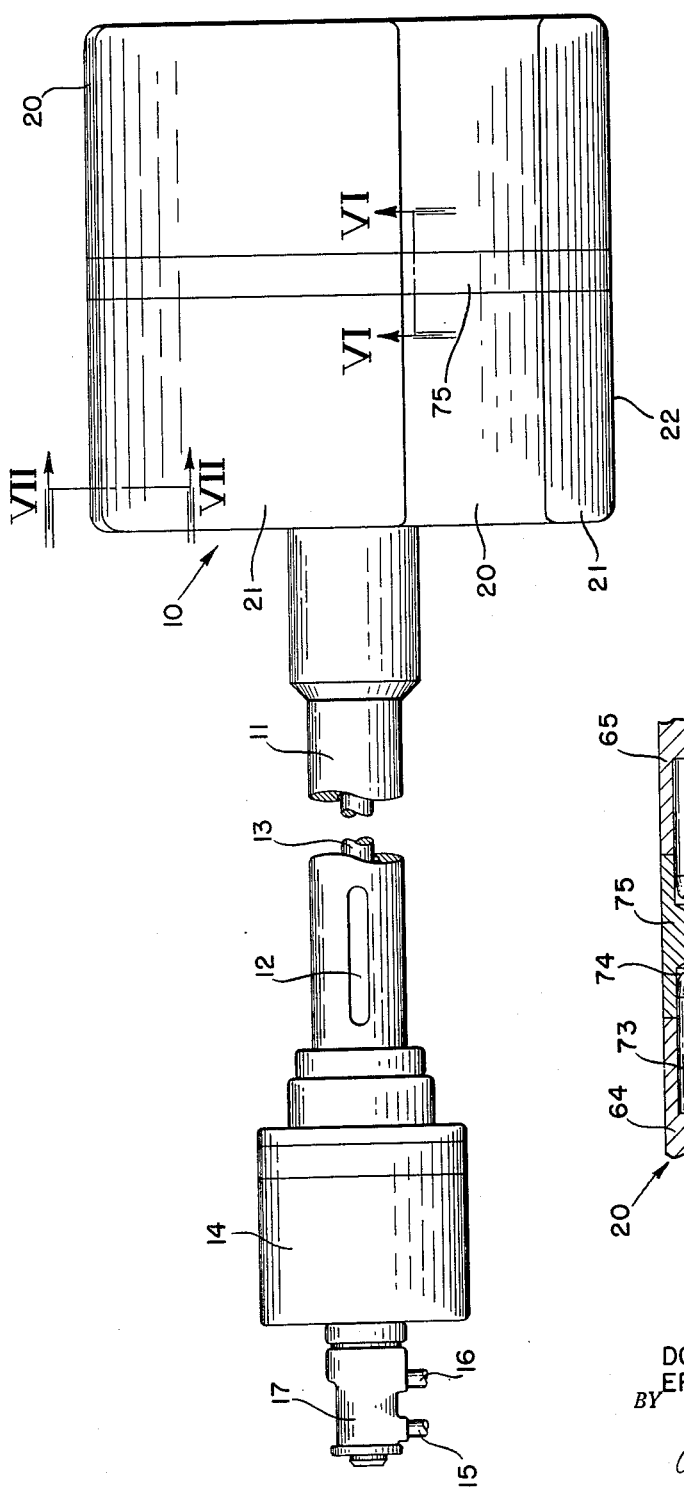
Fig. 1 is a side elevational view, with parts broken away and parts in section, of a tire building drum constructed according to the invention, shown in the expanded condition and mounted on a rotary support.

Referring to the drawings, and particularly to Fig. 1, a tire building drum 10 is shown supported on a tubular shaft 11 mounted for rotary movement on a conventional tire building machine (not shown). A suitable pulley or gear (not shown) may be attached to the shaft 11 by means of a key 12 for rotating the shaft. An actuating rod 13 extends axially through the tubular shaft 11 and into the drum for the purpose of actuating the expanding and collapsing mechanism of the drum in a manner to be described below. The actuating rod 13 is moved back and forth axially to collapse or expand the drum by means of a conventional double acting fluid operating cylinder 14 secured to one end of the shaft 11. It will be understood that the actuating rod 13 is attached to a piston (not shown) within the cylinder 14. Fluid under pressure is applied to the cylinder 14 through inlet and outlet conduits 15 and 16 of a conventional rotary seal coupling 17 mounted on the end of the cylinder. An example of a fluid operating arrangement of this type is disclosed in more detail in U. S. Patent 1,544,679 to Olson, dated July 7, 1925.

Referring particularly to Figs. 2 to 5, the drum 10 is composed of two sets of segments, namely, a set of smaller or key segments 20 and a set of intermediate larger segments 21, alternately disposed with respect to the key segments. When the drum is in the expanded condition the segments form a continuous smooth and uninterrupted cylindrical building surface 22 for assembling a raw tire band. Bevelled edges 23 (Fig. 2) of the key segments 20 bear outwardly against correspondingly bevelled edges of the larger segments when the drum is expanded.

The segments of the drum are supported from a central hub member 24 (Figs. 3 and 5) of the drum. A flange portion 25 on the inner end of the hub 24 abuts a mating flange 26 on the end of the tire building machine shaft 11, and the two flanges are detachably secured together by suitable means, such as by bolts (not shown) passing therethrough. For supporting the key segments 20, pairs of rigid axially spaced elongated lugs or arms 27, 28 extend radially from the hub 24, there being one pair of such arms radially spaced around the hub for each key segment. Each key segment 20 is joined to the axially inner arm 27 of such pair of arms by means of a pivotal link 29 that is joined to the key segment 20 by a pivot pin 30 and to the end of the arm 27 by a pivot pin 31. The remaining arm 28 is joined to the key segment by a lever 32, pivotally joined at one of its ends to the segment 20 by means of a pivot pin 33, and pivotally joined near its center to the end of the arm 28 by a pivot pin 34.

The larger segments 21 are supported from the hub 24 in an analogous manner. Pairs of radially extending arms 35, 36 fixed to the hub are joined to the intermediate segments 21 by a pivotal link 37 joined at its outer end to the segment 21 by a pivot pin 38 and joined at its inner end to the end of the arm 35 by a pivot pin 39. A bell crank lever 40 is joined at its outer end to the segment 21 by a pivot pin 41, while the end of the arm 36 is joined near the center of the bell crank lever 40 by a pivot pin 42.

To impart collapsing and expanding movement to the segments, each of the bell crank levers 32 is joined at its inner end by a pivot pin 45 to one end of a pivotal connecting link 46, while the other end of the link 46 is pivotally joined by a pivot pin 47 to a central axially movable block 48. The block 48 has a central aperture, fitting snugly over a reduced end portion 49 of a central actuating rod 50 extending slidably through the hub 24, and the block 48 is secured to the rod 50 by means of a nut 51 screwed onto the threaded end of the portion 49. When the drum is in the expanded condition, the inner face of the block 48 bears up against the end face 52 of the hub portion 24.

Within an enlarged hollow central portion 53 of the hub, the inner end of the actuating rod 50 is detachably secured, by means of a threaded stud 54, to the end of the principal actuating rod 13 passing into the hub 24 from the hollow drive shaft 11. A guide collar or flange 55 fixed on the end of the actuating rod 50 bears slidably against the walls of the passage 53 within the hub 24 and serves as a stop by abutting with the outer end face 56 of the passage 53 when the drum is in the collapsed position, as illustrated in Fig. 5. The rod 50 is slidably supported in a bearing sleeve 57 fitted within the outer portion of the central passageway of the hub 24. A socket 58 in the outer end of the actuating rod is adapted to receive a wrench for unscrewing the rod and stud 54 when it is desired to disconnect the drum from the actuating rod 13, for removal of the drum from the shaft 11.

The movable block 48 is also linked to the bell crank lever 40 of each of the larger segments 21 by means of a pivotal link 60 that is pivotally attached at one end of the block 48 by means of a pivot pin 61, and pivotally attached at the other end to the inner end of the bell crank lever 40 by means of a pivot pin 62.

For the purpose of adjusting the width of the building surface 22 of the drum for building tires of various sizes, each segment is made in two halves, such as halves 64 and 65 (Fig. 5) of segment 20, which are supported on a base plate of the segment, such as base plate 66 of segment 20. As shown in Fig. 7, the segment halves, such as half 64 of segment 20, are slidably interlocked with the base plate, such as plate 66. In order to secure the segment halves 64, 65 to the base plate 66 there is provided in the base plate a slot 67 (Figs. 7 and 8) which has tapered sides 68 (Fig. 7). The slot allows for a small amount of expansion of the base plate when pressure is applied to the sides of the slot. Positioned within the slot 67 is a correspondingly tapered sleeve 69 having a set screw 70 extending therethrough. By turning the set screw 70 into the tapered sleeve 69, the set screw strikes the segment half, such as segment half 64, and moves the tapered sleeve 69 downward in the slot 67 resulting in an outward expansion of the base plate 66 and thereby causing a locking engagement between the base plate 66 and the segment half 64. Each of the segment halves is provided with a similar arrangement for locking the segments with the corresponding base plate.

Figure 6:
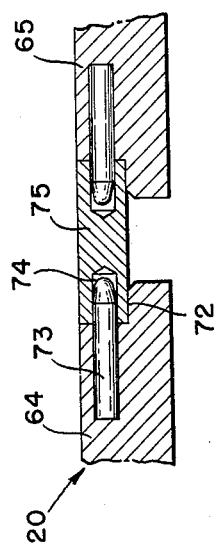
Fig. 6 is a fragmentary longitudinal sectional view on a larger scale taken along line 6—6 of Fig. 1, and showing details of a means for maintaining a removable spacer piece in place in the drum surface.
Figure 3:
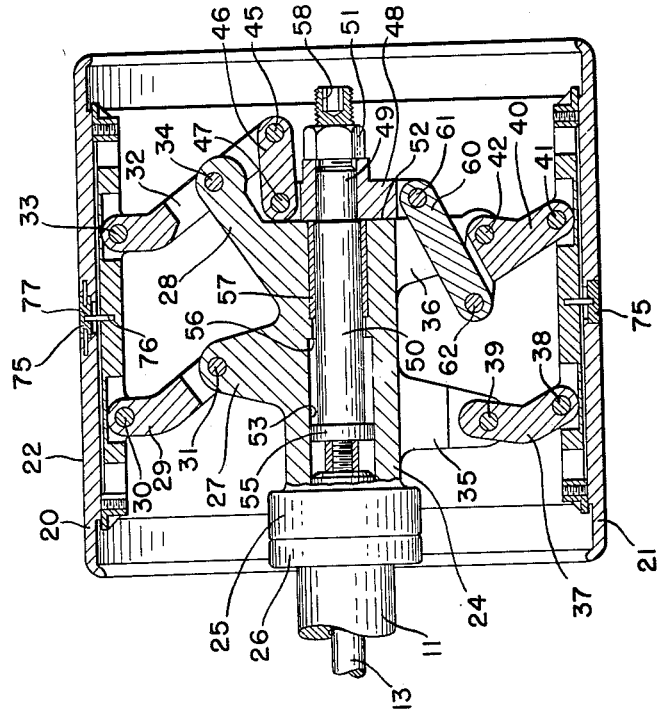
Fig. 3 is a longitudinal sectional view of the drum taken along the line 3—3 of Fig. 2.
Figure 2:
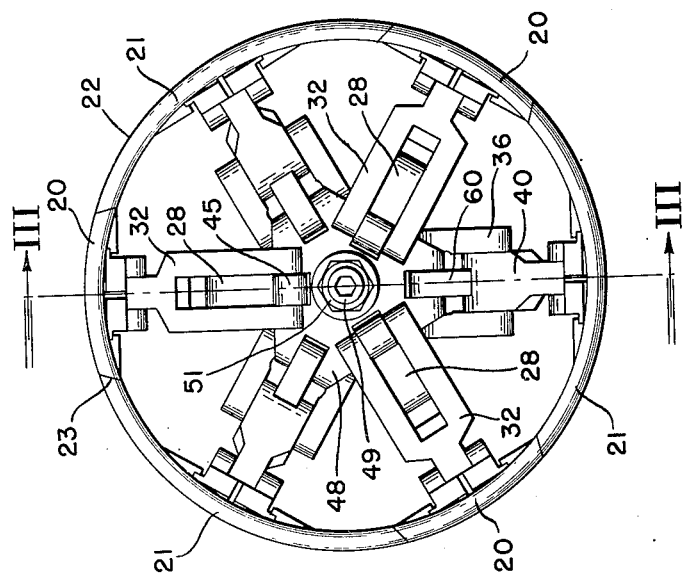
Fig. 2 is an end elevational view of the drum in the expanded condition.

The inner edges of the segment halves are provided with stepped portions 72, as indicated most clearly in the detailed view, Fig. 6. Axially extending guide pins 73 project from the upper portion of the inner edges of the segment halves and pass into cooperating sockets 74 in the opposite edges of a central spacer piece 75 that is disposed between the segment halves. The lower surface of the spacer piece rests on the stepped portions 72 of the inner edge of the segment halves. To further maintain the spacer piece in proper position, a locating pin 76 (Figs. 3 and 5) projects radially of the drum from the center of the base plate 66 and fits snugly into a cooperating socket 77 on the inner face of the base plate. The spacer piece 75 has the same arcuate form and length as the segment into which it is fitted, and each of the segments has its own snugly fitting spacer piece, so that the outer surfaces of the spacer pieces form an uninterrupted part of the smooth continuous building surface 22, as indicated in Fig. 1.

When it is desired to change the width of the segments the set screws 70 are loosened, and the segment halves are slid outwardly axially of the drum on the base plates 66. This disengages the axial guide pins 73 in the segment edges from the sockets 74 in the edges of the spacer pieces 75. The radial pins 76 keep the spacer pieces in place during this operation. The spacer pieces 75 may then be lifted off the locating pins 76, and different size spacer pieces may be substituted therefor. The segment halves are then moved inwardly again against the spacer pieces and the set screws 70 are tightened.

The operation of the collapsing linkage will now be described. To collapse the drum, fluid pressure is applied to the cylinder 14, moving the rod 13 within the shaft 11 axially of the drum, and at the same time moving the extension rod 50 and the block 48 outwardly from the hub 24 of the drum. Outward movement of the block 48 causes the pivotal links 46 and 60 to turn the levers 32 and 40, respectively, about their respective pivotal mountings 34 and 42. This causes the segments 20 and 21 to be moved inwardly on a radial and axial path. The segments are guided in their collapsing movement by a simultaneous movement of the secondary pivotal links 29 and 37 about their respective pivot points.

The pivotal linkage of the key segments 20 to the hub 24 differs from the linkage of the larger segments 21 to the hub in such manner that the key segments move inwardly radially at a faster rate than the larger segments, that is, the key segments are caused to move inwardly out of the way of the larger segments, which are thereafter drawn inwardly over the key segments. The reason for the more rapid radial movement of the key segments 20 lies in the fact that the arm of the lever 32 connected to the key segments 20 is longer than the arm of the bell crank lever 40 connected to the larger segments 21, so that a given axial movement of the block 48 produces greater radial movement of the key segments 20. Although the key segments collapse more rapidly radially than the larger segments, both the key segments and the larger segments have, during the initial period of collapse, essentially equal axial movement. The reason for this is that the pivot point 33 connecting the lever 32 to the key segment 20 is appreciably displaced from a vertical center line drawn through the pivot point 34 on which the lever 32 rotates. Because of this displacement away from the vertical, a given angular movement of the lever 32 will produce relatively less axial movement and relatively greater radial movement of the pin 33 and its attached segment 20 than would be the case if the pin 33 were in vertical alignment with the pin 34. The effect of this is to impart, during the initial period of collapse, an axial movement to the segments 20, which is equal to the axial movement of the larger segments 21, produced by the relatively short arm of the bell crank lever 40, connected to the pin 41, of the larger segments.

Thus, it will be seen that the relative disparity in length between the arms of the levers 32 and 40 is utilized to produce unequal radial collapsing movement of the two sets of segments, while at the same time the off-set positioning of the pivot 33 from the vertical is utilized to decrease the axial component of motion of the segments attached to the longer lever 32, making the axial movement of the key segments equal to the axial movement of the segments attached to the shorter bell crank lever 40. After the segments have collapsed a sufficient degree to clear the overlapping beads of the tire carcass, the segments become somewhat axially off-set, that is, they move at slightly unequal axial rates, and arrive in the collapsed condition indicated in Figs. 4 and 5.

The axial off-setting of the pin 33 from the vertical has the further advantage of increasing the radial component of motion of the segments 20 for a given annular movement of the lever 32, thereby further increasing the radial collapse of the segments 20 compared to the radial collapse of the segments 21.

Another advantageous feature of the present construction is that the center of the pivot 41 connected to the larger segments is disposed, in the initial position, slightly beyond the vertical center line drawn through the pivot 42 about which the bell crank lever 40 rotates. This means that the initial movement of the segments 21 as the collapsing movement begins will be radially outwardly as the pivot 41 travels from its over-center position to the vertical center line of the pivot 42. Thereafter, the movement of the segments 21 is inward. The effect of this initial outward movement of the larger segments is to further delay their radial movement compared to the radial movement of the smaller segments, so that the smaller or key segments are given an opportunity to move clear of the larger segments.

The invention therefore provides a simple, rugged, collapsing mechanism which moves the segments inwardly without appreciable initial axial off-setting thereof. This eliminates the danger of straining or distorting the beads of the raw tire carcass carried by the drum.

Because of the way the key segments are arranged to move out of the way of the larger segments with the larger segments overlapping the key segments in the collapsed condition, a relatively high degree of collapse is obtained.

The manner in which the invention provides for adjustment of the width of the building surface is particularly advantageous because such adjustment does not disturb or interrupt the smooth contour of the building surface. This means that the component parts of the tire can be assembled without danger of entrapping air therebetween, which would result in a defective tire.

Having thus described our invention, what we claim and desire to protect by Letters Patent is:

1. A collapsible tire building drum comprising in combination a hub, a set of arcuate key segments, a set of alternately disposed larger segments, links pivotally secured to the hub and pivotally secured to the segments, levers pivotally secured near their centers to the hub, and pivotally secured at one end to the key segments, an actuating block slidably mounted at the hub, pivotal links connecting the other end of the levers to said actuating block, further levers pivotally secured near their centers to the hub, and pivotally secured at one end to the larger segments, pivotal links connecting the opposite end of the said further levers to the said actuating block, the said levers and links extending in axial planes of the drum, and means for moving the block axially to collapse the segments, the levers connected to the key segments producing more rapid inward radial movement of the key segments than the further levers produce in the larger segments whereby the larger segments collapse in overlapping relation to the key segments.

2. A collapsible tire building drum comprising in combination a hub, a first set of arcuate segments, a second set of alternately disposed segments, an axially movable collapsing rod mounted within said hub, collapsing levers pivotally secured to the hub and pivotally secured at one end to the first segments and at the other end to the said collapsing rod, further collapsing levers pivotally secured to the hub and pivotally secured at one end to the second segments and at the other end to the said collapsing rod, the said collapsing levers extending in axial planes of the drum, and the collapsing levers connected to the first segments being longer than the collapsing levers connected to the second segments whereby axial movement of the collapsing rod produces a more rapid radial collapsing movement of the first segments than of the second segments.

3. A collapsible tire building drum comprising in combination a hub, a first set of arcuate segments, a second set of alternately disposed segments, an axially movable collapsing rod, collapsing levers pivotally connected to said hub and pivotally connected at one end to said first segments and at the other end to said collapsing rod, further collapsing levers pivotally connected to said hub and pivotally connected at one end to said second segments and at the other end to said collapsing rod, the collapsing levers extending in axial planes of the drum, and the collapsing levers connected to the first segments being longer than the collapsing levers connected to the second segments whereby axial movement of the collapsing rod produces a more rapid radial collapsing movement of the first segments than of the second segments, and the pivotal connection between said first collapsing levers and said first segments being off-set from a center line drawn transversely of the drum through the pivotal connection of said levers to the hub sufficiently to reduce the speed of the axial component of the collapsing movement of the first segments to the same speed as the axial movement of the second segments.

4. A collapsible tire building drum comprising in combination a hub, a first set of arcuate segments, a second set of alternately disposed segments, an axially movable collapsing rod, collapsing levers pivotally connected to said hub and pivotally connected at one end to said first segments and at the other end to said collapsing rod, further collapsing levers pivotally connected to said hub and pivotally connected at one end to said segments and at the other end to said collapsing rod, said collapsing levers extending in axial planes of the drum, and the pivotal connections between said collapsing levers and said segments being disposed in such relative positions as to produce equal axial movement of the segments and unequal radial movement of the segments upon axial movement of said collapsing rod.

5. A collapsible tire building drum comprising in combination a hub, a set of arcuate key segments, a set of alternately disposed larger segments, links pivotally secured to the hub and to the segments, levers pivotally secured to the hub, and pivotally secured at one end of the key segments, an actuating means movable axially of the drum, pivotal links connecting the other end of the levers to said actuating means, bell crank levers pivotally secured near their center to the hub, and pivotally secured at one end to the larger segments, pivotal links connecting the opposite end of said bell crank levers to the actuating means, the said links and levers extending in axial planes of the drum, and said levers connected to the key segments being longer than the bell crank levers connected to the larger segments, whereby the key segments collapse radially more rapidly than the larger segments.

6. A collapsible tire building drum comprising in combination a hub, a set of arcuate key segments, a set of alternately disposed larger segments, links pivotally secured to the hub and to the segments, levers pivotally secured to the hub, and pivotally secured at one end to the key segments, an actuating member movable axially of the drum, pivotal links connected to the other end of the levers and to said actuating means, bell crank levers pivotally secured near their center to the hub, and pivotally secured at one end to the larger segments, pivotal links connecting the opposite end of said bell crank levers to said actuating means, said levers and links extending in axial planes of the drum, and said further levers connected to the key segments being longer than the bell crank levers connected to the larger segments, whereby the key segments collapse radially more rapidly than the larger segments, and the pivotal attachment of the said levers to the key segments being sufficiently displaced in the direction of collapsing movement of the segments from a central line drawn transversely of the drum through the pivotal attachment of the said levers to the hub so that the axial component of the motion of the key segments is substantially equal to the axial component of motion of the larger segments during the initial period of collapse of the drum.

7. A collapsible tire building drum comprising in combination a hub, a set of arcuate key segments, a set of alternately disposed larger segments, links pivotally secured to the hub and to the segments, levers pivotally secured to the hub, and pivotally secured at one end to the key segments, an actuating means movable axially of the drum, pivotal links connecting the other end of the levers to said actuating means, bell crank levers pivotally secured near their center to the hub, and pivotally secured at one end to the larger segments, pivotal links connecting the opposite end of said bell crank levers to the said actuating means, said levers and links extending in axial planes of the drum, and said levers connected to the key segments being longer than the bell crank levers connected to the larger segments, whereby the key segments collapse radially more rapidly than the larger segments, and the pivotal attachment of the said levers to the key segments being sufficiently displaced in the direction of collapsing movement of the segments from a center line drawn transversely of the drum through the pivotal attachment of the said levers to the hub so that the axial component of motion of the key segments is substantially equal to the axial component of motion of the larger segments during initial period of collapse of the drum, and the pivotal attachment of the end of the bell crank levers to the larger segments being located slightly beyond center with respect to the pivotal attachment of the bell crank levers to the hub to provide slight outward movement of the larger segments at the start of the collapse.

8. A tire building drum comprising in combination a hub, a plurality of arcuate segments of definite circumferential lengths forming a smooth continuous building surface, a supporting mechanism securing said segments to said hub, said supporting mechanism including collapsing levers for collapsing the drum, each of the said segments being divided along a circumferential line into a pair of equal portions, each of said segment portions being adjustably secured to said supporting mechanism for adjustment axially of the drum, arcuate spacer pieces of the same circumferential length and curvature as said segment portions removably fitted between the two portions of each of said pairs of segment portions, the outer surface of the spacer pieces being flush with the outer surface of the segment portions to form a smooth continuous building surface.

9. A tire building drum comprising in combination a hub, a plurality of arcuate segments of definite circumferential lengths forming a smooth continuous building surface, a supporting mechanism securing said segments to said hub, said supporting mechanism including collapsing levers for collapsing the drum, each of the said segments being divided along a circumferential line into a pair of equal portions, each of said portions being adjustably secured to said supporting mechanism for adjusting movement in an axial direction, arcuate spacer pieces of the same circumferential length and curvature as said segments removably fitted between the two portions of each of said pairs of segment portions, the outer surface of the spacer pieces being flush with the outer surface of the segment portions to provide a smooth continuous building surface, guide members located at the transverse central line of the drum cooperating with guide members on the inner face of the spacer pieces at the center line thereof, whereby spacer pieces of various widths are interposable between the segment portions to provide building surfaces of various widths without changing the location of the center line of the building surface.

10. A tire building drum comprising in combination a hub, a plurality of arcuate segments of definite circumferential lengths forming a smooth continuous building surface, a supporting mechanism securing said segments to said hub, said supporting mechanism including collapsing levers for collapsing the drum, each of the said segments being divided along a circumferential line into a pair of equal portions, each of said portions being adjustably secured to said supporting mechanism for adjusting movement in an axial direction, arcuate spacer pieces of the same circumferential length and curvature as said segments fitted between the two portions of each of said pairs of segment portions, the outer surface of the spacer pieces being flush with the outer surface of the segment portions to form a smooth continuous building surface, and cooperating sockets and interfitting guide pins along the adjacent marginal edges of said spacer pieces and segment portions to maintain said spacer pieces in place.

11. A tire building drum comprising in combination a hub, a plurality of arcuate segments of definite circumferential lengths forming a smooth continuous building surface, a supporting mechanism securing said segments to said hub, said supporting mechanism including collapsing levers for collapsing the drum, each of the said segments being divided along a circumferential line into a pair of equal portions, each of said segment portions being adjustably secured to said supporting mechanism for adjustment in an axial direction, arcuate spacer pieces of the same circumferential length and curvature as said segments fitted between the two portions of each of said pairs of segment portions, the edges of said segment portions adjacent said spacer pieces being stepped for a definite distance below the outer surface of said segment portions, and the thickness of the spacer pieces at their edges being equal to the depth of said stepped portion, whereby the outer surface of the spacer pieces is flush with the outer surface of the segment portions, forming a smooth continuous building surface.

DONALD E. ERICSON.
ERNEST E. KWIERANT.

REFERENCES CITED

The following references are of record in the file of this patent:

UNITED STATES PATENTS

| Number | Name | Date |
|---|---|---|
| 1,877,746 | Heston et al. | Sept. 13, 1932 |
| 2,016,884 | Bostwick | Oct. 8, 1935 |
| 2,020,497 | Bostwick | Nov. 12, 1935 |
| 2,048,536 | Bostwick | July 21, 1936 |
| 2,201,469 | Bostwick | May 21, 1940 |
| 2,514,215 | Stevens et al. | July 4, 1950 |
| 2,583,650 | Hodgkins | Jan. 29, 1952 |
| 2,603,580 | Di Cicco et al. | July 15, 1952 |
| 2,603,581 | Ericson et al. | July 15, 1952 |